May 28, 1963    R. T. SULLIVAN    3,091,163
FOLDING CAMERA

Filed Jan. 5, 1961    3 Sheets-Sheet 1

INVENTOR.
Robert T. Sullivan
BY
Brown and Mikulka
ATTORNEYS

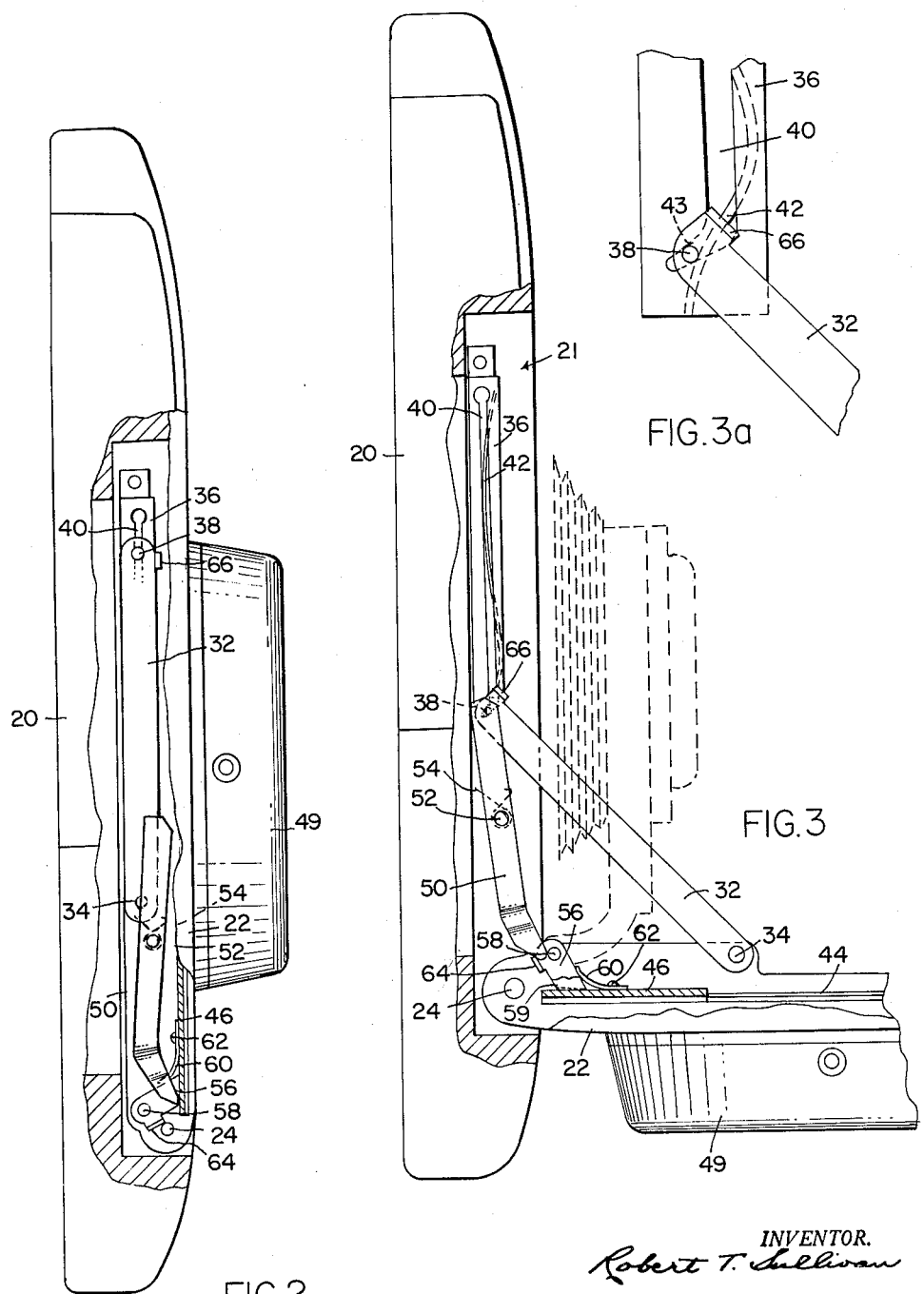

May 28, 1963  R. T. SULLIVAN  3,091,163
FOLDING CAMERA

Filed Jan. 5, 1961  3 Sheets-Sheet 3

INVENTOR.
Robert T. Sullivan
BY
Brown and Mikulka
ATTORNEYS 3,091,163
FOLDING CAMERA
Robert T. Sullivan, Norwood, Mass., assignor to Polaroid Corporation, Cambridge, Mass., a corporation of Delaware
Filed Jan. 5, 1961, Ser. No. 80,931
1 Claim. (Cl. 95—40)

This invention relates to photographic apparatus and more specifically to the construction of folding cameras of the hinged-base type. Such cameras are characterized by a base, or camera bed, hinged to a camera body and movable between open and closed positions with respect to the body.

In conventional folding-camera construction, means are provided for supporting the camera bed in a predetermined, fixed relationship to the camera body. Normally such means are mechanically locked when the camera is in the operating position so that the position of the bed is rigidly fixed. The supporting means must be movable between a locked position, which is often accomplished automatically as the bed is moved to the open position, and an unlocked position, allowing the camera to be folded.

It is an object of this invention to provide a new and improved folding camera construction wherein the camera may be quickly and conveniently opened and closed.

Another object is to provide a folding camera having means which mechanically lock the position of the camera bed when the camera is moved to the open position and which unlock automatically when the lens support is retracted in preparation for closing the camera.

A further object is to provide a folding camera, movable between open and closed positions, with novel means for rigidly locking the camera in the open position and for releasing the lock, allowing the camera to be closed.

Still another object is the provision of a folding camera which the operator may open, operate and close easily and efficiently with both hands remaining in the position they would normally occupy while operating the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a side elevational view, partly in section, of the camera of FIG. 1 shown in the closed position; and FIGS. 3 through 6, inclusive, are a series of fragmentary side elevational views, partly in section, of selected elements of the embodiment, showing the elements in a variety of positions, FIG. 3a being an enlarged view of a portion of FIG. 3.

Figure 1:
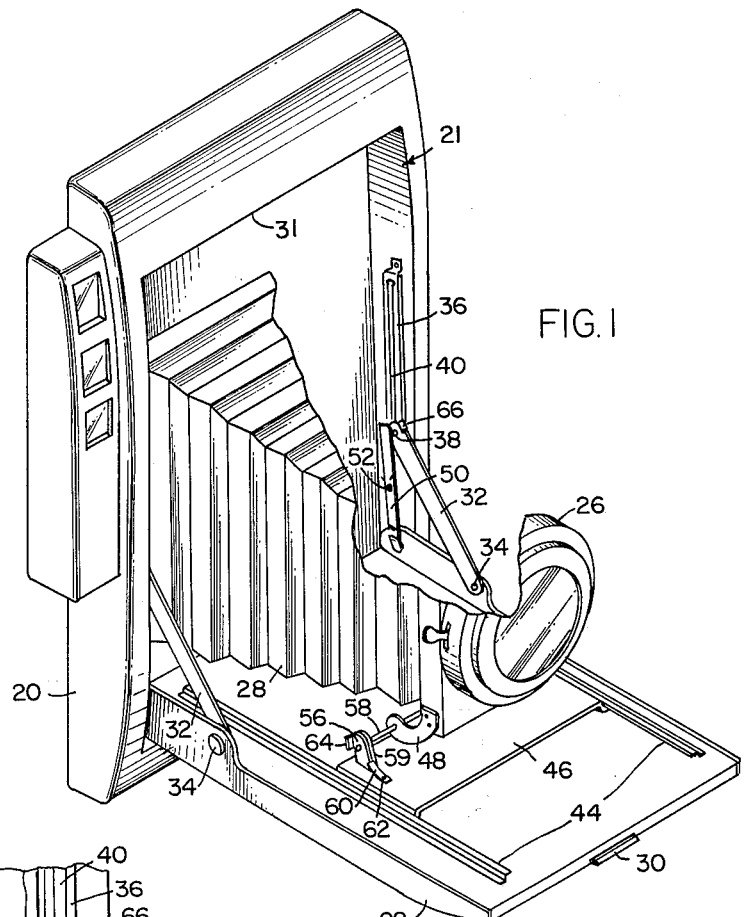
FIGURE 1 is a fragmentary, perspective view of a camera embodying the subject invention, shown in the fully open position.

Referring now to the drawings, wherein like numerals denote like parts, the elements are shown in FIGS. 2 through 6 as they would appear from a position at the side of the camera, with the camera bed opening toward the right. The direction of movement and the location of elements as hereinafter described are those which would be observed when said elements are viewed from the above-described position, the descriptive language being in accordance with said position and not in any sense a limitation otherwise.

In FIGURE 1 is seen an handheld camera of the folding type, well known in the art, which incorporates the elements embodying the principles of the present invention. The camera comprises a camera body 20 having an opening 21 through which other elements of the camera may be extended, and camera bed 22 pivotally attached to body 20 by hinge 24. For the purposes of this disclosure, the camera body and bed may be of any suitable design and hinged together by conventional means well known to those skilled in the art. The bed 22 turns about hinge 24 in moving to and from the open and closed positions, shown in FIGS. 1 and 2 respectively, with respect to the body 20. A lens support 26, which may also house a shutter mechanism (not shown), is operatively connected to body 20 within opening 21 by the usual extensible and collapsible means such as bellows 28. Suitable latch means 30 are provided on bed 22 and cooperate with a portion 31 of body 20 for releasably retaining the camera in the closed position.

In accordance with conventional folding camera construction, the elements which support the camera bed in a fixed relationship to the body when in the open position are duplicated, one set of elements being provided on each side of the camera. In the interest of clarity and brevity, reference hereinafter will be made to the elements in the singular, like numerals being used to denote like duplicated elements. When the camera is in the open position, bed 22 extends substantially perpendicularly from body 20. It is held in this position by bed brace 32 which extends from bed 22, where it is pivotally attached at 34, to body 20. Bed brace guide 36 is mounted on body 20 within opening 21 in the manner illustrated and is constructed and arranged so as to form a hollow enclosure. Pin 38 is mounted upon bed brace 32 and passes through slot 40 in bed brace guide 36. When the camera is in the closed position, as shown in FIG. 2, pin 38 is near the top of slot 40. As bed 22 is moved to the open position, pin 38 slides downwardly in slot 40. Pin 38 is urged rearwardly by spring 42, and thus enters the rearwardly extending lower portion of slot 40. The upper surface 43 of the lower portion of slot 40 is perpendicular to the long axis of bed brace 32 when the camera is in the open position. Therefore, any inward force exerted on bed 22 is transmitted through bed brace 32 normal to surface 43. The lower portion of slot 40 is tapered so that the radius at the end of the slot is less than the radius of pin 38, preventing the pin from bottoming in the slot and eliminating any free motion, or play, of bed 22 when the camera is in the open position. Thus, bed 22 is rigidly locked in position relative to body 20 immediately upon movement to the open position.

As shown in FIG. 1, camera bed 22 is provided with a pair of tracks 44 which extend outwardly substantially perpendicular to the axis of rotation of bed 22 about hinge 24, and are substantially parallel to one another. The lens support 26 is mounted upon a movable element or slide 46 in any convenient manner, as by supporting links 48. Slide 46 has a pair of opposite edges slidingly engaging tracks 44 and is movable along bed 22, away from and toward body 20. Movement of slide 46 may be effected in many ways known to those skilled in the art. In a preferred embodiment both protraction of lens support 26 upon slide 46 to the operating position and focusing movement may be accomplished by manual rotation of knob 49. For a detailed description of one method of translating rotational movement of knob 49 to movement of lens support 26 through slide 46, reference may be made to the co-pending application of Robert S. Borghesani, Serial No. 60,037, filed October 3, 1960, entitled "Camera Mechanism," and assigned to applicant's assignee.

Release lever 50 is pivotally mounted on pin 52 which extends from a fixed mounting upon body 20 within opening 21. The pivotal lever mounting is slightly above the mid-point of release lever 50, leaving it free to move at both ends. Spring 54 passes around pin 52 and in front of lever 50 at a point above pin 52, whereby the upper end of lever 50 is urged rearwardly or counter-clockwise as viewed in FIGS. 2 through 6, by the pressure of spring 54. An actuating member such as release actuator 56 is mounted upon shaft 58 which extends laterally across slide 46, being held in position thereon by suitable means such as brackets 59. The eccentric shape of release actuator 56 is such as to allow pivotal movement about shaft 58 in one direction only, counterclockwise as viewed in FIGS. 2 through 6. Leaf spring 60 is mounted on slide 46 by known means, such as rivet 62, and exerts clockwise rotational force on release actuator 56. Ear 64 extends substantially perpendicularly from release actuator 56 and is arranged in a position such that it will contact the lower end of release lever 50 when slide 46 is moved relative thereto. Such contact exerts rotational force on release lever 50; upon clockwise rotation, the upper end of release lever 50 contacts ear 66 on bed brace 32.

Figure 4:
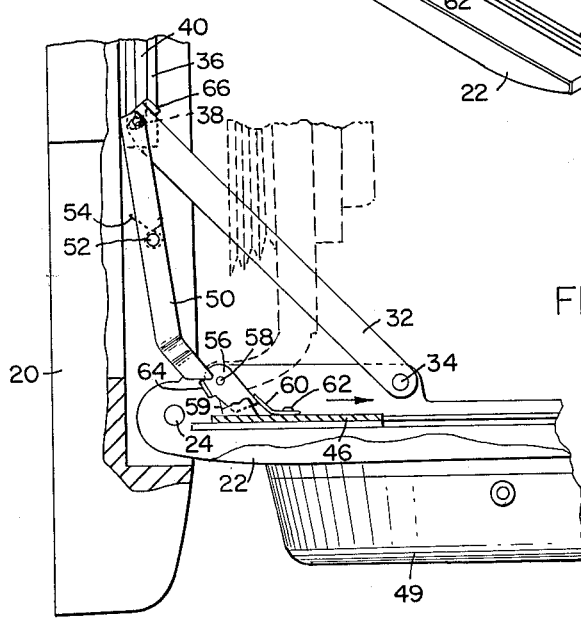
Figure 6:
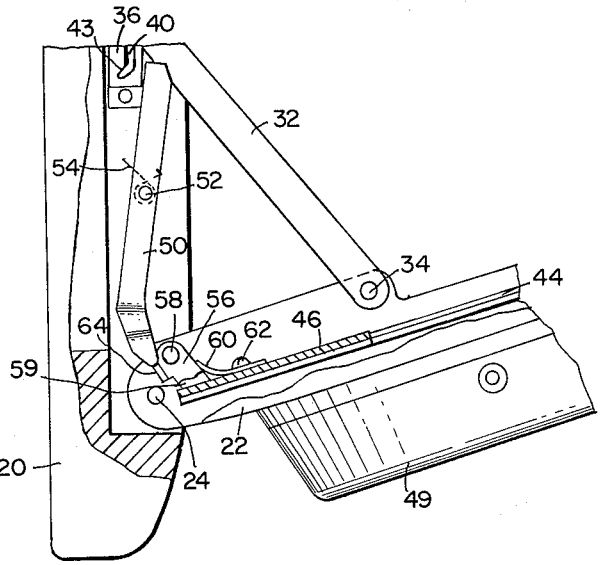
Figure 5:
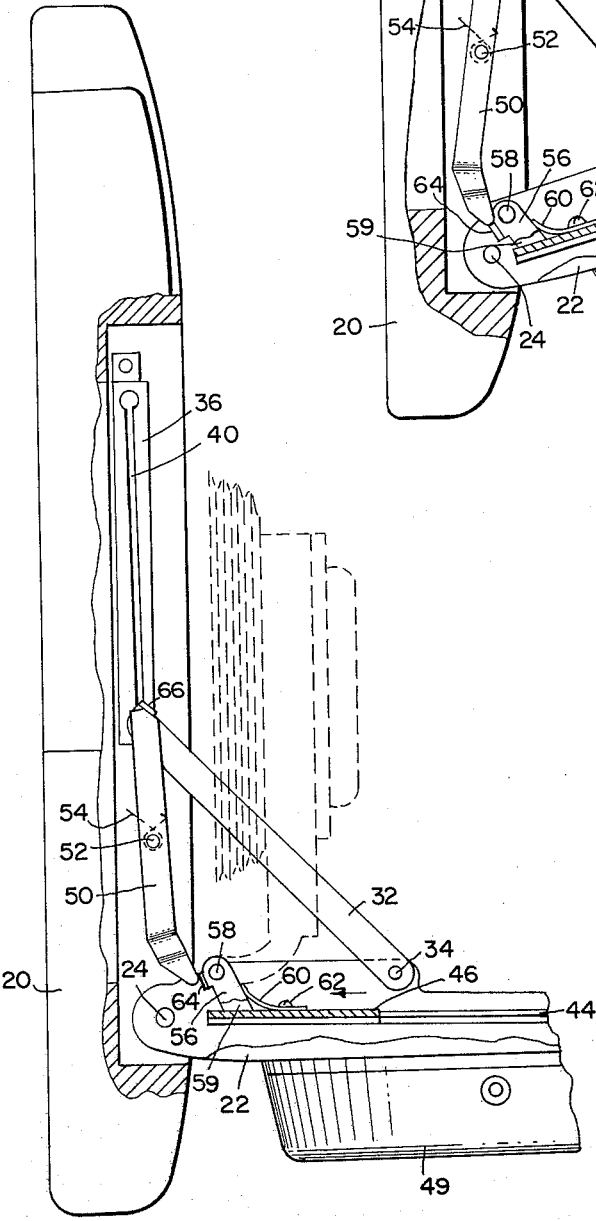

Referring now to FIGS. 2 through 6, the sequence of operations of the elements just described is shown in moving the camera from the closed to the open and back to the closed position. With the camera in the closed position, the elements are in the position shown in FIG. 2. Latch means 30 is released and bed 22 rotates outwardly from body 20 about hinge 24. Pin 38 slides downwardly in slot 40 until bed 22 has moved to a position substantially perpendicular to body 20, at which time the pin 38 is urged by spring 42 into the rearwardly extending lower portion of slot 40. Bed brace 32 rigidly locks the position of bed 22 as previously described and the elements are in the position illustrated in FIG. 3. Knob 49 is rotated in order to extend slide 46, and the elements mounted thereon, on bed 22, away from body 20. Ear 64 on release actuator 56 contacts the lower end of lever 50 and release actuator 56 is rotated about its pivotal mounting on shaft 58 as shown in FIG. 4; counterclockwise rotation of lever 50 is limited by contact of the upper end thereof with body 20. As slide 46 continues to advance, ear 64 passes under lever 50 and is returned to its original position by the bias of leaf spring 60. Continued rotation of knob 49 brings the camera elements to the operating position and focusing movement of the objective lens may be effected, again through rotation of knob 49. In order to move the camera to the closed position, slide 46 is retracted on bed 22 by counter-rotation of knob 49. As slide 46 approaches the rearmost position, ear 64 contacts the lower end of lever 50. Since release actuator 56 cannot rotate clockwise, due to its shape and position, continued movement of slide 46 causes clockwise rotation of lever 50 against the pressure of spring 54. The upper end of lever 50 contacts ear 66, urging bed brace 32 forward, as shown in FIG. 5. Pin 38 is thus moved out of the rearwardly extending lower portion of slot 40 and is free to ride upward in slot 40, allowing bed 22 to be moved toward the closed position. As previously mentioned, the pivotal mounting of lever 50 is at a point above the mid-point of lever 50, thus giving added leverage to overcome friction between pin 38 and surface 43 even though such friction be increased by inward pressure on bed 22 as knob 49 is being rotated. As bed 22 is moved about hinge 24, slide 46 and the elements mounted thereon turn with it, ear 64 causing further clockwise rotation of lever 50. Continued movement of bed 22 toward the closed position results in lever 50 overriding ear 64, the position of the elements being shown in FIG. 6 just before overriding occurs. The pressure of spring 54 causes counterclockwise rotation of lever 50 and, upon closing, the parts are returned to the position shown in FIG. 2.

From the foregoing description it may be readily seen that the camera bed erecting system of the present invention provides a folding camera construction which greatly facilitates the movement of the camera between open and closed positions. In the embodiment herein disclosed, the camera bed may be moved to the open position, the lens support protracted to the operating position, focusing movement effected, the lens support moved to the retracted position and the camera closed, the only operation necessary being that of turning the knob on the outside of the camera bed. The elements of the erecting system which rigidly lock the position of the camera bed in the open positions move automatically between the locked and unlocked positions.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

A folding camera comprising a camera body having an opening therein, a lens and shutter assembly operatively connected by expansible and collapsible means to said body within said opening, a substantially rectangular camera bed hingedly connected at one of its edges to said body along one side of said opening, said bed being movable about its hinged connection between a closed position wherein said bed substantially covers said opening and an open position wherein said bed extends substantially perpendicularly from said body, latch means for releasably retaining said bed in said closed position, a carrier element mounted upon said bed for linear movement thereon away from and toward said body from a position adjacent said opening, said lens and shutter assembly being mounted on said carrier element for movement therewith, a substantially straight erecting link pivotally attached at a first end thereof to said camera bed and having a pin extending from the second end thereof to slidably engage a slot on said body, said slot having an engagement portion at one end thereof into which said pin is resiliently urged by spring means when said bed is in said open position, a substantially straight disengagement link pivotally attached between its ends to said body, an actuating member pivotally mounted on said carrier element for movement therewith, an ear on said actuating member which engages the lower end of said disengagement link during movement of said carrier element, spring means urging said actuating member into a first position from which said actuating member may be pivotally moved in one direction only, said actuating member being moved about its pivotal mounting by engagement of said ear with said disengagement link during movement of said carrier element away from said body and said disengagement link being moved about its pivotal mounting by said actuating member during movement of said carrier element toward said body, said disengagement link having an upper end which is moved into engagement with a projection on said erecting link when said disengagement link is moved about its pivotal mounting by said actuating member, said pin being moved out of said engagement portion of said slot by movement of said erecting link through engagement of said projection by said disengagement link whereby said bed may be moved to said closed position upon movement of said carrier element to the end of said bed adjacent said opening.

References Cited in the file of this patent

UNITED STATES PATENTS 1,362,833    Balston  ---------------- Dec. 21, 1920
2,069,968    Nagel  ------------------ Feb. 9, 1937